(12) United States Patent
Wang et al.

(10) Patent No.: US 8,774,266 B2
(45) Date of Patent: *Jul. 8, 2014

(54) CODING, STORAGE AND SIGNALLING OF SCALABILITY INFORMATION

(75) Inventors: Ye-Kui Wang, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 1611 days.

This patent is subject to a terminal disclaimer.

(21) Appl. No.: 11/404,106

(22) Filed: Apr. 13, 2006

(65) Prior Publication Data

US 2006/0256851 A1    Nov. 16, 2006

Related U.S. Application Data

(60) Provisional application No. 60/671,215, filed on Apr. 13, 2005.

(51) Int. Cl.
    *H04N 7/12*    (2006.01)
(52) U.S. Cl.
    USPC ........... 375/240.01; 375/240.21; 375/240.26; 375/240.02; 375/240.25; 382/235; 382/239; 382/243; 382/233
(58) Field of Classification Search
    USPC ............ 375/240.01, 240.21, 240.26, 240.02, 375/240.25; 382/235, 239, 243, 233
    See application file for complete search history.

(56) References Cited

U.S. PATENT DOCUMENTS

| 6,501,797 | B1 | 12/2002 | Van Der Schaar et al. |
| 6,724,820 | B2 * | 4/2004 | Ramanzin ............... 375/240.12 |
| 7,586,924 | B2 * | 9/2009 | Wiegand ............... 370/395.64 |
| 2001/0024470 | A1 * | 9/2001 | Radha et al. ............... 375/240.1 |
| 2004/0006575 | A1 * | 1/2004 | Visharam et al. .......... 707/104.1 |
| 2004/0139462 | A1 | 7/2004 | Hannuksela et al. |
| 2005/0254575 | A1 * | 11/2005 | Hannuksela et al. ...... 375/240.1 |
| 2007/0160126 | A1 * | 7/2007 | Van Der Meer et al. ...... 375/240 |

FOREIGN PATENT DOCUMENTS

| KR | 20030081772 | 10/2003 |
| KR | 20040106414 | 6/2006 |
| RU | 2073913 | 2/1997 |
| RU | 20010123542 | 2/2007 |

(Continued)

OTHER PUBLICATIONS

"Applications and Requirements for Scalable Video Coding;" International Organisation for Standardisation, ISO/IEC JTC1/SC29/WG11 N6880, Coding of Moving Pictures and Audio; Jan. 2005, Hong Kong, China.

(Continued)

*Primary Examiner* — Shawn An
(74) *Attorney, Agent, or Firm* — Alston & Bird LLP (57) ABSTRACT

A method and device for encoding, decoding, storage and transmission of a scalable data stream to include layers having different coding properties including: producing one or more layers of the scalable data stream, wherein the coding properties include at least one of the following: Fine granularity scalability information; Region-of-interest scalability information; Sub-sample scalable layer information; Decoding dependency information; and Initial parameter sets, and signaling the layers with the characterized coding property such that they are readable by a decoder without the need to decode the entire layers. A corresponding method of encoding, decoding, storage, and transmission of a scalable bit stream is also disclosed, wherein at least two scalability layers are present and each layer has a set of at least one property, such as those above identified.

21 Claims, 5 Drawing Sheets

(56) References Cited

FOREIGN PATENT DOCUMENTS

| WO | WO 01/03442 | 1/2001 |
|---|---|---|
| WO | WO 02/45440 | 6/2002 |
| WO | WO 03/063505 | 7/2003 |
| WO | WO 2005/022918 | 3/2005 |

OTHER PUBLICATIONS

"Overview of Fine Granularity Scalability in MPEG-4 Video Standard;" Weiping Li; IEEE Transactions on Circuits and Systems for Video Technology; vol. 11, No. 3, Mar. 2001.

"Scalable Video Coding—Working Draft 1"; Joint Video Team (JVT) of ISO/IEC MPEG & ITU-T VCEG; Editors: Julien Reichel, Heiko Schwarz and Mathias Wien.

M. Domanski, et al; "Fine Granularity in Multi-Loop Hybrid Coders with Multi-Layer Scalability"; Proceeding of the 2002 International Conference on Image Processing, vol. 3, Jun. 24-28, 2002; pp. 741-744, section 2.

"ITU—Telecommunication Standardization Sector, Study Group 16, Question 6 Video Coding Expert Group (VCEG), VCEG-N52, Fourteenth Meeting: Santa Barbara, Sep. 21-24, 2001"; p. 3, paragraph 1.

Russian National Standard GOST 7.83-2001; whole document.

Joint Video Team (JVT) of ISO/IEC MPEG & ITU-T VCEG (ISO/IEC JTC1/SC29/WG11 and ITU-T SG16 Q.6); 14$^{th}$ Meeting: Hong Kong, CN, Jan. 17-21, 2005; "Scalable Video Coding—Working Draft 1"; whole document.

Thomas Wiegand, et al; "Overview of the H.264/AVC Video Coding Standard"; IEEE Transactions on Circuits and Systems for Video Technology, vol. 13, No. 7, Jul. 2003; pp. 560-576.

International Search Report and Written Opinion for Application No. PCT/FI2006/050136 dated Oct. 16, 2007.

\* cited by examiner

CODING, STORAGE AND SIGNALLING OF SCALABILITY INFORMATION

CROSS REFERENCE TO RELATED APPLICATION

This application claims priority under 35 USC §119 to U.S. Provisional Patent Application No. 60/671,215 filed on Apr. 13, 2005.

FIELD OF THE INVENTION

The present invention is directed to an encoder, a decoder, a device, method, data record, module, computer program product, and system for data encoding, decoding, storage and transmission of a scalable data stream comprising at least two scalability layers.

BACKGROUND OF THE INVENTION

Multimedia applications include local playback, streaming or on-demand, conversational and broadcast/multicast services. Interoperability is important for fast deployment and large-scale market formation of each multimedia application. To achieve high interoperability, different standards are specified.

Technologies involved in multimedia applications include, among others, media coding, storage and transmission. Media types include speech, audio, image, video, graphics and time text. Different standards have been specified for different technologies. Video coding standards include ITU-T H.261, ISO/IEC MPEG-1 Visual, ITU-T H.262 or ISO/IEC MPEG-2 Visual, ISO/IEC MPEG-4 Visual, ITU-T H.264 or ISO/IEC MPEG-4 AVC (abbreviated as AVC, AVC/H.264 or H.264/AVC in this document), and the possible future ones such as ISO/IEC MPEG-21 SVC, China AVS, ITU-T H.265, and ISO/IEC MPEG 3DAV.

Available media file format standards include ISO file format (ISO/IEC 14496-12), MPEG-4 file format (ISO/IEC 14496-14), AVC file format (ISO/IEC 14496-15) and 3GPP file format (3GPP TS 26.244).

3GPP TS 26.140 specifies the media types, formats and codecs for the multimedia messaging services (MMS) within the 3GPP system. 3GPP TS 26.234 specifies the protocols and codecs for the packet-switched streaming services (PSS) within the 3GPP system. The ongoing 3GPP TS 26.346 specifies the protocols and codecs for multimedia broadcast/multicast services (MBMS) within the 3GPP system.

Typical audio and video coding standards specify "profiles" and "levels." A "profile" is a subset of algorithmic features of the standard and a "level" is a set of limits to the coding parameters that impose a set of constraints in decoder resource consumption. Indicated profile and level can be used to signal properties of a media stream and to signal the capability of a media decoder.

Through the combination of profile and level, a decoder can declare whether it can decode a stream without trying decoding, which may cause the decoder to crash, to operate slower than real-time, and/or to discard data due to buffer overflows, if the decoder is not capable of decoding the stream. Each pair of profile and level forms an "interoperability point."

Some coding standards allow creation of scalable bit streams. A meaningful decoded representation can be produced by decoding only certain parts of a scalable bit stream. Scalable bit streams can be used for rate adaptation of pre-encoded unicast streams in a streaming server and for transmission of a single bit stream to terminals having different capabilities and/or with different network conditions. A list of other use cases for scalable video coding can be found in the ISO/IEC JTC1 SC29 WG11 (MPEG) output document N6880, "Applications and Requirements for Scalable Video Coding", the 71st MPEG meeting, January 2005, Hong Kong, China.

Scalable coding technologies include conventional layered scalable coding techniques and fine granularity scalable coding. A review of these techniques can be found in an article by Weiping Li entitled "Overview of fine granularity scalability in MPEG-4 video standard," IEEE Transactions on Circuits and Systems for Video Technology, vol. 11, no. 3, pp. 301-317, March 2001.

Scalable video coding is a desirable feature for many multimedia applications and services used in systems employing decoders with a wide range of processing power. Several types of video scalability schemes have been proposed, such as temporal, spatial and quality scalability. These proposed types consist of a base layer and an enhancement layer. The base layer is the minimum amount of data required to decode the video stream, while the enhancement layer is the additional data required to provide an enhanced video signal.

The working draft of the scalable extension to H.264/AVC currently enables coding of multiple scalable layers. The working draft is described in JVT-N020, "Scalable video coding—working draft 1," 14th meeting, Hong Kong, January 2005, and is also known as MPEG document w6901, "Working Draft 1.0 of 14496-10:200x/AMD1 Scalable Video Coding," Hong Kong meeting, January 2005. In this coding of multiple scalable layers, the variable DependencyID signaled in the bitstream is used to indicate the coding dependencies of different scalable layers.

A scalable bit stream contains at least two scalability layers, the base layer and one or more enhancement layers. If one scalable bit stream contains more than one scalability layer, it then has the same number of alternatives for decoding and playback. Each layer is a decoding alternative. Layer 0, the base layer, is the first decoding alternative. Layer 1, the first enhancement layer, is the second decoding alternative. This pattern continues with subsequent layers. Typically, a lower layer is contained in the higher layers. For example, layer 0 is contained in layer 1, and layer 1 is contained in layer 2.

Each layer is characterized by a set of at least one property, such as Fine granularity scalability (FGS) information, Region-of-interest (ROI) scalability information, sub-sample scalable layer information, decoding dependency information, and initial parameter sets, that may be different from that of the entire stream.

In previous systems, it has not been possible to signal the following scalability information for a particular layer of a scalable bit stream in the bit stream itself, in the file format or through a transmission protocol: Fine granularity scalability (FGS) information; Region-of-interest (ROI) scalability information; Sub-sample or sub-picture scalable layer information; Decoding dependency information; and Initial parameter sets.

SUMMARY OF THE INVENTION

The present invention allows for encoding, decoding, storage, and transmission of a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream, and wherein said set of at least one property is signaled for at least one layer that is different from the entire stream, wherein signaling of said set of at least one property may be in said scalable bit stream, in a file format container containing said scalable bit stream, or in a transmission or control protocol for transmission or control of at least one layer of said scalable bit stream. With the present invention, a server or client does not need to analyze the FGS information, ROI scalability information, sub-sample scalable layer information, decoding dependency information, and initial parameter sets of each layer of a stream by verifying the bit stream, thus reducing the computational complexity. For devices that are not capable of analyzing the layer properties from the bit stream, e.g., when the ROI information is required but not available, with the present invention, inclusion of device sub-unit to enable the capability is avoided.

One exemplary embodiment of the present invention discloses a method and device for encoding a scalable data stream to include layers having different coding properties. The method includes: producing one or more layers of the scalable data stream, wherein the layers are characterized by a coding property that is different than a coding property of the scalable data stream, and signaling the layers with the characterized coding property such that they are readable by a decoder without the need to decode the entire layers.

Another exemplary embodiment of the present invention discloses a method and device for encoding a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream, and wherein said set of at least one property is signaled for at least one layer that is different from the entire stream, wherein signaling of said set of at least one property is in said scalable bit stream. The method includes: producing a scalable bit stream to included at least two layers, each layer is characterized by a set of at least one property, such as FGS information, ROI scalability information, sub-sample scalable layer information, decoding dependency information, and initial parameter sets, that may be different from that of the entire stream, and signaling, in said scalable bit stream, said set of at least one property, for at least one layer that is different from the entire stream, such that said set of at least one property is readable by a without the need of analyzing said set of at least one property or trying to decode a layer of said scalable bit stream without the knowledge of whether the device have the capability to decode the layer, which may lead to a device crash.

Another exemplary embodiment of the invention discloses a method and device for analyzing a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream. The method includes: analyzing said set of at least one property such that said set of at least one property can be signaled in said scalable bit stream, in a file format container containing said scalable bit stream, or in a transmission or control protocol for transmission or control of at least one layer of said scalable bit stream.

Another exemplary embodiment of the invention discloses a method and device for converting a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream, and wherein said set of at least one property is signaled for at least one layer that is different from the entire stream, wherein signaling of said set of at least one property may be in said scalable bit stream, in a file format container containing said scalable bit stream, or in a transmission or control protocol for transmission or control of at least one layer of said scalable bit stream. The method includes: creation of a non-scalable bit stream containing the base layer of said scalable bit stream, creation of a second scalable bit stream containing an enhancement layer of said scalable bit stream.

Another exemplary embodiment of the invention discloses a method and device for decoding a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream, and wherein said set of at least one property is signaled for at least one layer that is different from the entire stream, wherein signaling of said set of at least one property may be in said scalable bit stream, in a file format container containing said scalable bit stream, or in a transmission or control protocol for transmission or control of at least one layer of said scalable bit stream. The device comprises: a first component for receiving said scalable bit stream, a second component for identifying at least one layer in said scalable bit stream and reading said set of at least one property of said at least one layer, a third component for determining whether the decoder is capable of decoding said at least one layer based on said set of at least one property, and a fourth component for decoding said at least one layer if the third component determines that the decoder is capable of decoding said at least one layer.

Another exemplary embodiment of the invention discloses a method and device for storage of a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream. The method includes: analyzing said at least one property if not signaled in said scalable bit stream, storing said at least one property and said scalable bit stream with or without said at least one property in the bit stream to a file format container according to a file format specification.

Another exemplary embodiment of the invention discloses a method and a device for transmission of at least one layer of a scalable bit stream, wherein at least two scalability layers are present and each layer is characterized by a set of at least one property, such as FGS information, ROI scalability information, sub-sample scalable layer information, decoding dependency information, and initial parameter sets, that may be different from that of the entire stream, and wherein said set of at least one property is signaled for at least one layer that is different from the entire stream, wherein signaling of said set of at least one property may be in said scalable bit stream or in a file format container containing said scalable bit stream. The device comprises: a first component for making present information on the available layers or alternatives for decoding and playback to a set of at least one receiver, wherein the receivers may be divided into at least one receiver group, each receiver group consists of at least one receiver; a second component for deciding at least one layer from said available layers to serve a receiver or a receiver group according to request and/or information on said receiver or a receiver group, and a third component for transmission and control of said at least one layer to said receiver or a receiver group.

Compared to earlier designs, the proposed design is more complete, in the sense that the following scalability information types are additionally included: Region-of-interest (ROI) scalability information; Buffer information; Fine granularity scalability (FGS) information; Sub-sample scalable layer information; Decoding dependency information; Initial parameter sets.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION

In an exemplary embodiment, the present invention solves the problems described above by signaling a set of at least one property, such as FGS information, ROI scalability information, sub-sample scalable layer information, decoding dependency information, and initial parameter sets, that may be different from that of the entire stream, for a layer of a scalable bit stream. Signaling of said set of at least one property may be in said scalable bit stream, in a file format container containing said scalable bit stream, or in a transmission or control protocol for transmission or control of at least one layer of said scalable bit stream.

Technologies involved in multimedia applications include, among others, media coding, storage and transmission. Media types include speech, audio, image, video, graphics and time text. While video coding is described herein as an exemplary application for the present invention, the invention is not limited thereby. Those skilled in the art will recognize that the present invention can be used with all media types, not only video.

Figure 2:
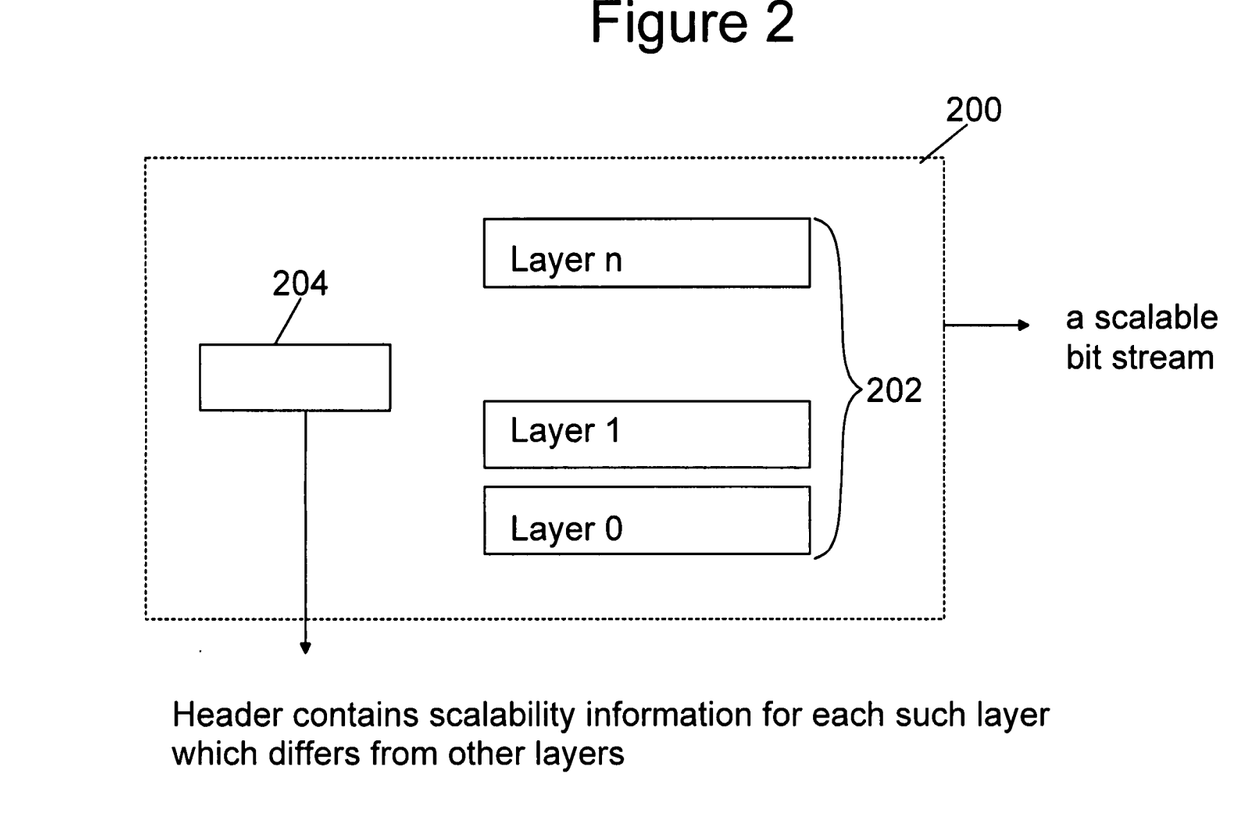
FIG. 2 is a diagram illustrating signaling of a set of at least one property information for a scalable bit stream in an exemplary embodiment of the present invention.

FIG. 2 illustrates signaling of a set of at least one property information for each layer of a scalable bit stream 200 in an exemplary embodiment of the present invention. Each layer of the scalable bit stream is characterized by the set of at least one property information signaled for the layer, thus allowing selection of a layer for decoding or transmission according to the set of at least one property information. These characterizations can be stored in header 204. The multiple layers 202 represent the plurality of layers in the scalable bit stream.

In a first example of the use of the present invention, a scalable bit stream is coded and stored in a streaming server. A set of at least one property information, such as fine granularity scalability information, region-of-interest scalability information, sub-sample or sub-picture scalable layer information, decoding dependency information, and initial parameter sets, of each layer is signaled in the stored file. When describing the available session, the server can create an SDP (Session Description Protocol) description for each layer or alternative of the scalable bit stream in the same file such that a streaming client can conclude whether there is an ideal layer and choose an ideal layer for streaming playback according to the SDP descriptions. If the server has no prior knowledge on receiver capabilities, it is advantageous to create multiple SDP descriptions from the same content, and these descriptions are then called alternates. The client can then pick the description that suits its capabilities the best.

In a second example of the use of the present invention, a stream such as that described in the first example is multicast or broadcast to multiple terminals. The multicast/broadcast server can announce all the available layers or decoding and playback alternatives, each of which is characterized by a combination of fine granularity scalability information, region-of-interest scalability information, sub-sample or sub-picture scalable layer information, decoding dependency information, and initial parameter sets. The client can then know from the broadcast/multicast session announcement whether there is an ideal layer for it and choose an ideal layer for playback.

In a third example of the use of the present invention, for local playback applications, even though the entire signaled stream cannot be decoded, it may still be possible to decode and enjoy part of the stream.

Figure 3:
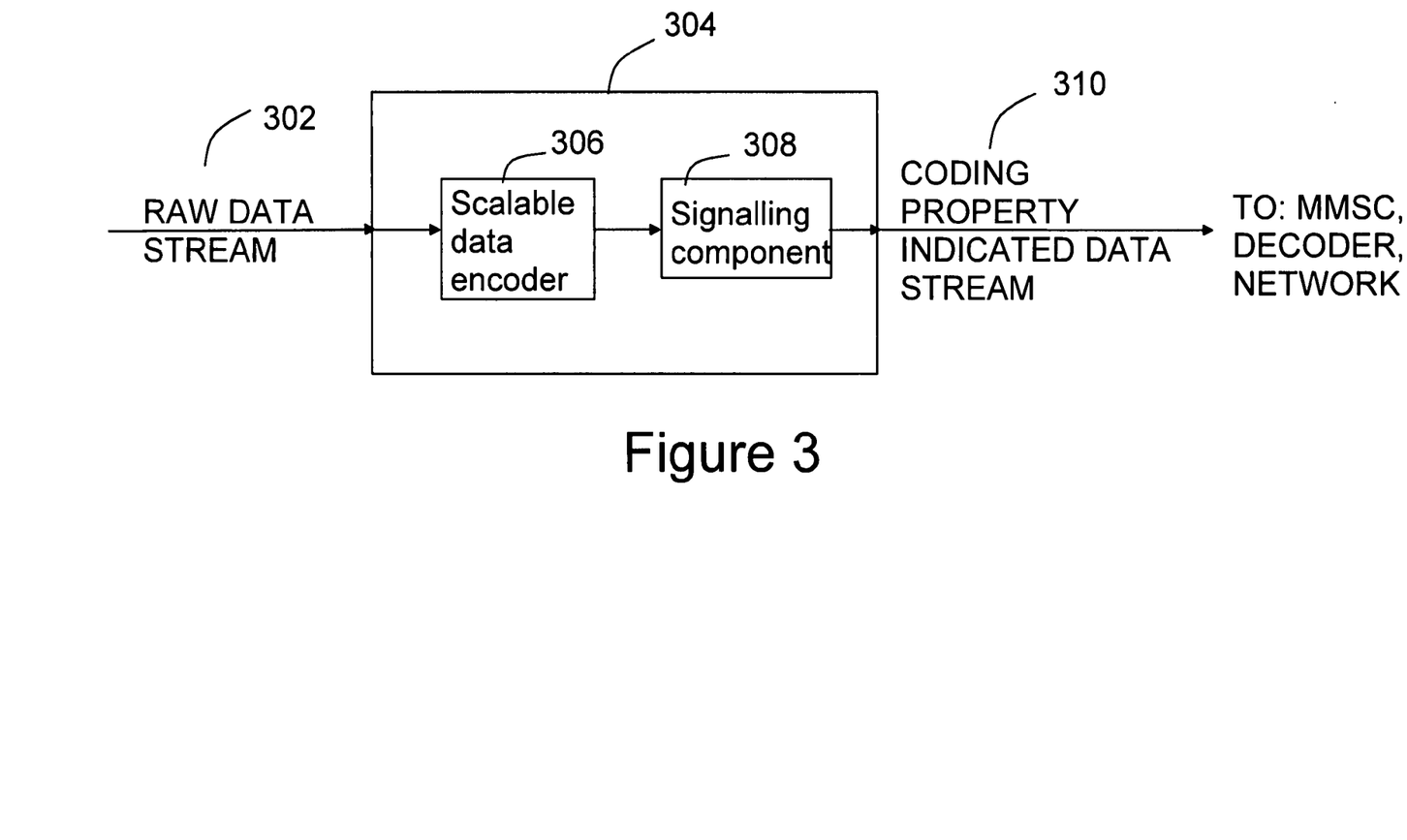
FIG. 3 is a diagram illustrating an encoding device in an exemplary embodiment of the present invention.

FIG. 3 is a diagram illustrating an encoding device in an exemplary embodiment of the present invention. The encoding device 304 receives a raw data stream 302. The data stream is encoded and one or more layers are produced by the scalable data encoder 306 of the encoder 304. These layers are then signaled by the signaling component 308. Some of the layers may have already been signaled by the scalable data encoder 306 and the signaling component will check for such occurrences. The coding property indicated data stream 310 is output from the encoder 304, thus allowing a receiving device (MMSC or decoder) to read the signals in order to determine the coding properties of the layers of the data stream.

Figure 4:
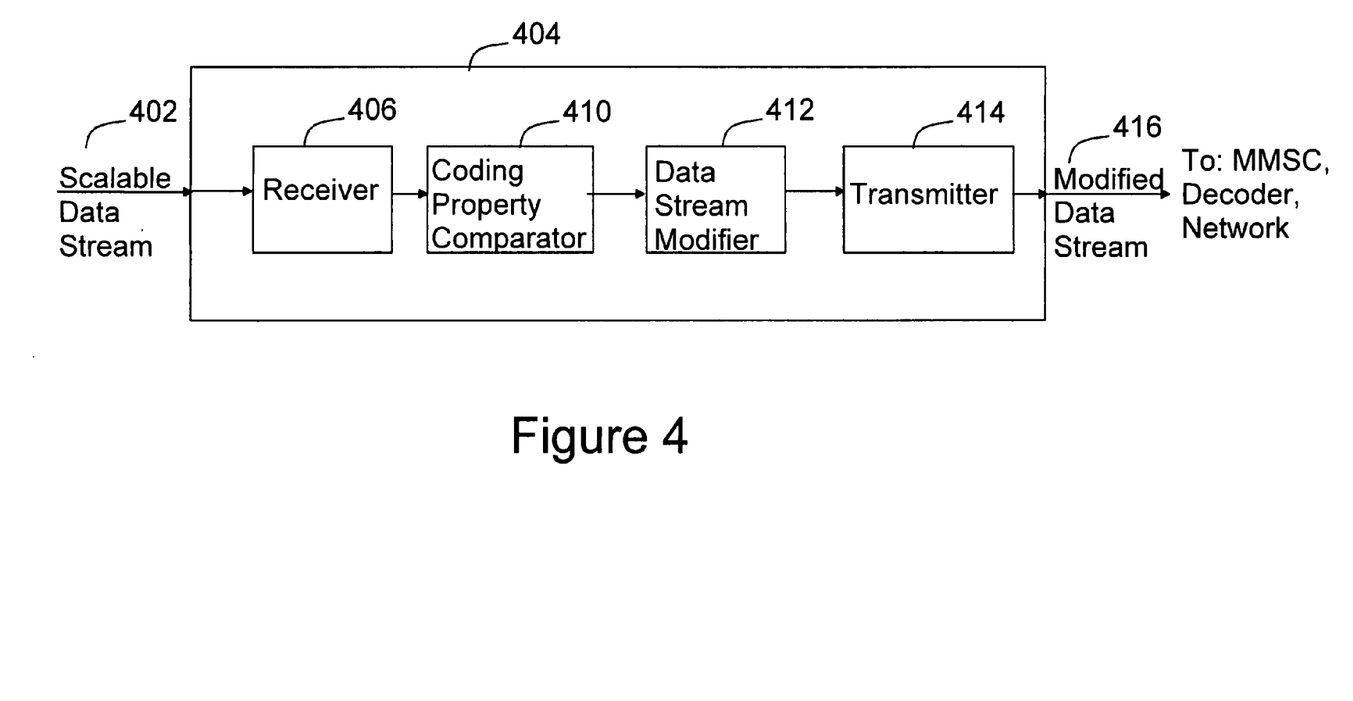
FIG. 4 is a diagram illustrating a converter device in an exemplary embodiment of the present invention.

FIG. 4 is a diagram illustrating a converter device in an exemplary embodiment of the present invention. The converter device 404 receives a scalable data stream 402 at receiver 406. Receiver 406 also reads the coding property indicators associated with layers of the received data stream. The coding property comparator 410 compares the coding property indicators with the already known capabilities of the decoding device or network to which the data stream is destined. Through this comparison, it determines what layers the destination device will be able to decode. The data stream is then modified in data stream modifier 412 in order to make the data stream decodable by the destination device. This may involve removing layers from the data stream that were determined in element 410 to be undecodable by the destination device. The modified data stream is then transmitted by transmitter 414. The modified data stream 416 is output from the converter 404 destined for a receiving device (MMSC or decoder).

Figure 5:
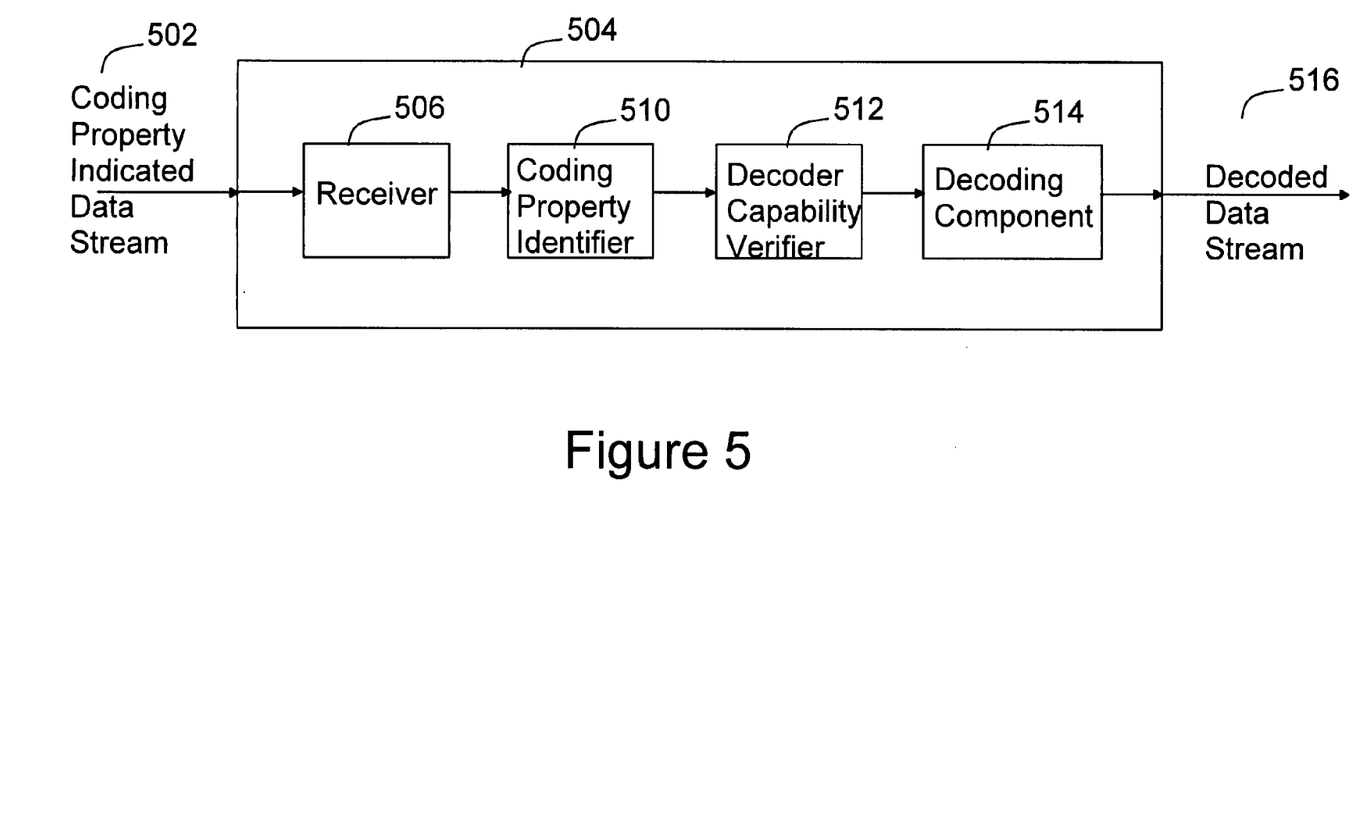
FIG. 5 is a diagram illustrating a decoder device in an exemplary embodiment of the present invention.

FIG. 5 is a diagram illustrating a decoder in an exemplary embodiment of the present invention. The decoding device 504 receives a coding property indicated data stream 502 at receiver 504. A coding property identifier 510 identifies one or more layers in the received data stream and their corresponding coding properties. Based on the coding property of at least one of the layers, the decoder capability verifier 512 determines whether the decoder is capable of decoding that layer. If it is, it allows the decoding component 514 to proceed with decoding that layer of the data stream. If not, it prevents the decoding component 514 from attempting to decode the layer, thus avoiding a potential crash of the decoder. The decoded data stream 516 is shown in the figure as output from the decoder 504.

Signaling in Bit Stream

Preferably, the layer characteristics are signaled in the sequence or group of pictures (GOP) level, such as through sequence or GOP headers, sequence parameter sets, Supplemental Enhancement Information (SEI) messages, user data and other sequence level syntax.

In the JSVM 1.0 (JVT-N023), a scalability information SEI is specified to assist a bitstream extractor in analyzing the scalability features of the bitstream. The SEI as it is in JSVM 1.0 may be too specific to the current SVC implementation in the JSVM reference software. In the following, a new syntax for the scalability information SEI is proposed that enables the following system level operations without parsing and analyzing into any coded slice NAL unit (with the only exception for region-of-interest scalability based on sub-picture scalable layers):

A file format composer to write scalability information metadata into the file;

A streaming server to offer all the possible scalable presentation points to receivers;

A bitstream exactor to extract any desired scalable presentation point; and

A media-aware network element (e.g. gateway) to decide which NAL units are to be discarded (hence not transmitted) for a desired scalable presentation point.

The new syntax is as shown in Table 1 and described below. Of course, it would be apparent to those skilled in the art that other ways of signaling are possible and that the invention is not limited to the specific method of signaling. Categories (labeled in Table 1 as C) specify the partitioning of slice data into at most three slice data partitions and the descriptors specify the parsing process of each syntax element. The categories and descriptors are disclosed in the above mentioned document "Working Draft 1.0 of 14496-10:200x/AMD1 Scalable Video Coding".

TABLE 1

| scalability_info( payloadSize ) { | C | Descriptor |
|---|---|---|
| num_layers_minus1 | 5 | ue(v) |
| for ( i = 0; i <= num_layers_minus1; i++ ) { | | |
|   fgs_layer_flag[ i ] | 5 | u(1) |
|   sub_pic_layer_flag[ i ] | 5 | u(1) |
|   sub_region_layer_flag[ i ] | 5 | u(1) |
|   profile_level_info_present_flag[ i ] | 5 | u(1) |
|   decoding_dependency_info_present_flag[ i ] | 5 | u(1) |
|   bitrate_info_present_flag[ i ] | 5 | u(1) |
|   frm_rate_info_present_flag[ i ] | 5 | u(1) |
|   frm_size_info_present_flag[ i ] | 5 | u(1) |
|   layer_dependency_info_present_flag[ i ] | 5 | u(1) |
|   init_parameter_sets_info_present_flag[ i ] | 5 | u(1) |
|   if (profile_level_info_present_flag[ i ]) { | | |
|     layer_profile_idc[ i ] | 5 | u(8) |
|     layer_constraint_set0_flag[ i ] | 5 | u(1) |
|     layer_constraint_set1_flag[ i ] | 5 | u(1) |
|     layer_constraint_set2_flag[ i ] | 5 | u(1) |
|     layer_constraint_set3_flag[ i ] | 5 | u(1) |
|     reserved_zero_4bits /* equal to 0 */ | 5 | u(4) |
|     layer_level_idc[ i ] | 5 | u(8) |
|   } | | |
|   if (decoding_dependency_info_present_flag[ i ]) { | | |
|     dependency_id[ i ] | 5 | u(3) |
|     temporal_level[ i ] | 5 | u(3) |
|   } | | |
|   if (bitrate_info_present_flag[ i ]) { | | |
|     avg_bitrate[ i ] | 5 | u(16) |
|     max_bitrate[ i ] | 5 | u(16) |
|   } | | |
|   if(frm_rate_info_present_flag[ i ]) { | | |
|     constant_frm_rate_idc[ i ] | 5 | u(2) |
|     avg_frm_rate[ i ] | 5 | u(16) |
|   } | | |
|   if(frm_size_info_present_flag[ i ]) { | | |
|     frm_width_in_mbs_minus1[ i ] | 5 | ue(v) |
|     frm_height_in_mbs_minus1[ i ] | 5 | ue(v) |
|   } | | |
|   if (sub_region_layer_flag[ i ]) { | | |
|     horizontal_offset[ i ] | 5 | u(16) |
|     verticial_offset[ i ] | 5 | u(16) |
|     region_width[ i ] | 5 | u(16) |
|     region_height[ i ] | 5 | u(16) |
|   } | | |
|   If (layer_depdendency_info_present_flag[ i ]) { | | |
|     num_directly_dependent_layers[ i ] | 5 | ue(v) |
|     for (j = 0; j < num_directly_dependent_layers[ i ]; j++ ) | | |
|       directly_dependent_layer_id_delta[ i ][ j ] | 5 | ue(v) |
|   } | | |

TABLE 1-continued

| scalability_info( payloadSize ) { | C | Descriptor |
|---|---|---|
|     If (init_parameter_sets_info_present_flag[ i ]) { | | |
|         num_init_seq_parameter_set_minus1[ i ] | 5 | ue(v) |
|         for ( j = 0; j <= num_seq_parameter_set_minus1[ i ]; j++ ) | | |
|             init_seq_parameter_set_id_delta[ i ][ j ] | 5 | ue(v) |
|         num_init_pic_parameter_set_minus1[ i ] | 5 | ue(v) |
|         for ( j = 0; j <= num_pic_parameter_set_minus1[ i ]; j++ ) | | |
|             init_pic_parameter_set_id_delta[ i ][ j ] | 5 | ue(v) |
|     } | | |
| } | | |

Semantics are specified as follows. When present, this SEI message shall appear in an IDR access unit. The semantics of the message are valid until the next SEI message of the same type.

num_layers_minus1 plus 1 indicates the number of scalable layers or presentation points supported by the bitstream. The value of num_layers_minus1 is in the scope of 0 to 255, inclusive.

Each scalable layer is associated with a layer ID. The layer ID is assigned as follows. A larger value of layer ID indicates a higher layer. A value 0 indicates the lowest layer. Decoding and presentation of a layer is independent of any higher layer but may be dependent on a lower layer. Therefore, the lowest layer can be decoded and presented independently, decoding and presentation layer 1 may be dependent on layer 0, decoding and presentation of layer 2 may be dependent on layers 0 and 1, and so on. The representation of a scalable layer requires the presence of the scalable layer itself and all the lower layers on which the scalable layer are directly or indirectly dependent. In the following, a scalable layer and all the lower layers on which the scalable layer are directly or indirectly dependent are collectively called as the scalable layer representation.

The mapping of each coded picture to a scalable layer may be signaled by the sub-sequence information SEI message.

fgs_layer_flag[i] equal to 1 indicates that the scalable layer with layer ID equal to i is a fine granularity scalable (FGS) layer. A value 0 indicates that the scalable layer is not an FGS layer. The coded slice NAL units of an FGS layer can be truncated at any byte-aligned position.

Since truncation and transmission of NAL unit header and slice header of an FGS slice does not improve quality, it may be needed to include the size of the NAL unit header and slice header for each FGS slice and the minimum meaningful bitrate for each FGS layer, both in the bitstream and/or in the file format, for media-unaware network elements to do FGS.

sub_pic_layer_flag[i] equal to 1 indicates that the scalable layer with layer ID equal to i consists of sub-pictures, each sub-picture consists of a subset of coded slices of an access unit. A value 0 indicates that the scalable layer consists of entire access units.

The mapping of each sub-picture of a coded picture to a scalable layer may be signaled by the sub-picture layer information SEI message.

sub_region_layer_flag[i] equal to 1 indicates that the scalable layer with layer ID equal to i represents a sub-region of the entire region represented by the entire bitstream. A value 0 indicates that the scalable layer represents the entire region represented by the entire bitstream.

profile_level_info_present_flag[i] equal to 1 indicates the presence of the profile and level information for the scalable layer with layer ID equal to i in the SEI message. A value 0 indicates that the profile and level information for the scalable layer with layer ID equal to i is not present in the SEI message.

decoding_dependency_info_present_flag[i] equal to 1 indicates the presence of the decoding dependency information for the scalable layer with layer ID equal to i in the SEI message. A value 0 indicates that the decoding dependency information for the scalable layer with layer ID equal to i is not present in the SEI message.

bitrate_info_present_flag[i] equal to 1 indicates the presence of the bitrate information for the scalable layer with layer ID equal to i in the SEI message. A value 0 indicates that the bitrate information for the scalable layer with layer ID equal to i is not present in the SEI message.

frm_rate_info_present_flag[i] equal to 1 indicates the presence of the frame rate information for the scalable layer with layer ID equal to i in the SEI message. A value 0 indicates that the frame rate information for the scalable layer with layer ID equal to i is not present in the SEI message.

frm_size_info_present_flag[i] equal to 1 indicates the presence of the frame size information for the scalable layer with layer ID equal to i in the SEI message. A value 0 indicates that the frame size information for the scalable layer with layer ID equal to i is not present in the SEI message.

layer_dependency_info_present_flag[i] equal to 1 indicates the presence of the layer dependency information for the scalable layer with layer ID equal to i in the SEI message. A value 0 indicates that the layer dependency information for the scalable layer with layer ID equal to i is not present in the SEI message.

init_parameter_sets_info_present_flag[i] equal to 1 indicates the presence of the initial parameter sets information for the scalable layer with layer ID equal to i in the SEI message. A value 0 indicates that the initial parameter sets information for the scalable layer with layer ID equal to i is not present in the SEI message.

The initial parameter sets refers to those parameter sets that can be transmitted in the beginning of the session.

The message components layer_profile_idc[i], layer_constraint_set0_flag[i], layer_constraint_set1_flag[i], layer_constraint_set2_flag[i], layer_constraint_set3_flag[i], and layer_level_idc[i] indicate the profile and level compliancy of the bitstream of the representation of scalable layer with layer ID equal to i. The semantics of layer_profile_idc[i], layer_constraint_set0_flag[i], layer_constraint_set1_flag[i], layer_constraint_set2_flag[i], layer_constraint_set3_flag[i], and layer_level_idc[i] are identical to the semantics of profile_idc, constraint_set0_flag, constraint_set1_flag, constraint_set2_flag, constraint_set2_flag and level_idc, respectively, unless herein the target bitstream being the bitstream of the scalable layer representation.

dependency_id[i] and temporal_level[i] are equal to DependencyId and TemproalLevel, respectively, of the NAL units in the scalable layer with layer ID equal to i.

avg_bitrate[i] indicates the average bit rate, in units of 1000 bits per second, of the bitstream of the representation of scalable layer with layer ID equal to i. The semantics of avg_bitrate[i] is identical to the semantics of average_bit_rate in sub-sequence layer characteristics SEI message when accurate_statistics_flag is equal to 1, unless herein the target bitstream being the bitstream of the scalable layer representation.

max_bitrate[i] indicates the maximum bit rate, in units of 1000 bits per second, of the bitstream of the representation of scalable layer with layer ID equal to i, in any one-second time window of access unit removal time.

constant_frm_rate_idc[i] indicates whether the frame rate of the representation of the scalable layer with layer ID equal to i is constant. If the value of avg_frm_rate as specified in below is constant whichever temporal section of the scalable layer representation is used for the calculation, then the frame rate is constant, otherwise the frame rate is non-constant. Value 0 denotes a non-constant frame rate, value 1 denotes a constant frame rate, and value 2 denotes that it is not clear whether the frame rate is constant or not. The value of constantFrameRate is in the range of 0 to 2, inclusive.

avg_frm_rate[i] indicates the average frame rate, in units of frames per second, of the bitstream of the representation of scalable layer with layer ID equal to i. The semantics of avg_frm_rate[i] is identical to the semantics of average_frame_rate in sub-sequence layer characteristics SEI message when accurate_statistics_flag is equal to 1, unless herein the target bitstream being the bitstream of the scalable layer representation.

frm_width_in_mbs_minus1[i] plus 1 indicates the maximum width, in macroblocks, of a coded frame in the representation of the scalable layer with layer ID equal to i.

frm_height_in_mbs_minus1[i] plus 1 indicates the maximum height, in macroblocks, of a coded frame in the representation of the scalable layer with layer ID equal to i.

horizontal_offset[i] and verticial_offset[i] give the horizontal and vertical offsets, respectively, of the top-left pixel of the rectangular region represented by the representation of the scalable layer with layer ID equal to i, in relative to the top-left pixel of the overall region represented by the entire bitstream. The unit is of luma samples in the scale of the highest spatial resolution.

region_width[i] and region_height[i] give the width and height, respectively, of the rectangular region represented by the representation of the scalable layer with layer ID equal to i, in luma samples in the scale of the highest spatial resolution.

num_directly_dependent_layers[i] indicates the number of scalable layers that the scalable layer with layer ID equal to i is directly dependent on. The value of num_directly_dependent_layers is in the scope of 0 to 255, inclusive.

directly_dependent_layer_id_delta[i][j] indicates the difference between the layer ID of the $j^{th}$ scalable layer that the scalable layer with layer ID equal to i is directly dependent on and i. The layer ID of the directly dependent-on scalable layer is equal to (directly_dependent_layer_id_delta+i).

num_init_seq_parameter_set_minus1 [i] plus 1 indicates the number of initial sequence parameter sets for decoding the representation of the scalable layer with layer ID equal to i.

init_seq_parameter_set_id_delta[i][j] indicates the value of the seq_parameter_set_id of the jth initial sequence parameter set for decoding the representation of the scalable layer with layer ID equal to i if j is equal to 0. If j is larger than 0, init_seq_parameter_set_id_delta[i][j] indicates the difference between the value of the seq_parameter_set_id of the jth initial sequence parameter set and the value of the seq_parameter_set_id of the (j−1)th initial sequence parameter set. The initial sequence parameter sets are logically ordered in ascending order of the value of seq_parameter_set_id.

Mapping of access units to scalable layers is signaled using sub-sequence information SEI messages. The sub_seq_layer_num in the sub-sequence information SEI message indicates the layer ID of the scalable layer to which the current access unit belongs.

To map sub-pictures to scalable layers, a new SEI message is defined as shown in Table 2.

This design is simple, but parsing into picture parameter set and slices are needed to identify whether a slice belongs to a motion-constrained slice group set. Alternatively, we can design a sub-picture-level SEI to signal the layer ID.

TABLE 2

| sub_pic_layer_info( payloadSize ) { | C | Descriptor |
|---|---|---|
| layer_id | 5 | ue(v) |
| } | | |

When present, this SEI message shall appear in the same SEI payload containing a motion-constrained slice group set SEI message and immediately succeeds the motion-constrained slice group set SEI message in decoding order. The slice group set identified by the motion-constrained slice group set SEI message is called the associated slice group set of the sub-picture layer information SEI message.

layer_id indicates the layer ID of the scalable layer to which the coded slice NAL units in the associated slice group set belongs.

For another example, support of the signaling can be achieved by the following method using sequence parameter set and NAL unit header or slice header.

Signaling in File Format

The signaling information may not be present in the bit stream for any of the following reasons: 1) the signaling is not supported by the coding technique or standard, 2) the signaling is supported but not present, 3) the file format specification disallows including of some information in the bit stream contained in the file format container, for example, the AVC file format specification disallows including of the three kinds of sub-sequence SEI messages in the bit stream stored in media tracks.

Therefore, it is important to support signaling of the information in file format. Actually, even if the information is available in the bit stream, to have the information available in file format is helpful for servers that are agnostic of media coding format.

The scalability structures in below are designed in the way to be usable for all types of scalable video streams, hence could be considered as an extension to the ISO base media file format. For file identification purpose, the brand 'svc1' can be used to indicate that this extension is used in a file.

To support the signaling, an ISO file should contain zero or one instance of a SampleToGroupBox (per track) with a grouping_type equal to 'scif'. This SampleToGroupBox instance maps each sample to one or more scalable layers. The scalability information for each scalable layer is stored in the corresponding sample group description entry (ScalabilityInfoEntry) that is included in the SampleGroupDescriptionBox of grouping type 'scif'. Scalability information includes layer ID, profile and level, bitrate, frame rate, buffer parameters and dependency information.

Again, each scalable layer is associated with a layer ID. The layer ID is assigned as follows. A larger value of layer ID indicates a higher layer. A value 0 indicates the lowest layer. Decoding and presentation of a layer is independent of any higher layer but may be dependent on a lower layer. Therefore, the lowest layer can be decoded and presented independently, decoding and presentation layer 1 may be dependent on layer 0, decoding and presentation of layer 2 may be dependent on layers 0 and 1, and so on. The representation of a scalable layer requires the presence of the scalable layer itself and all the lower layers on which the scalable layer are directly or indirectly dependent. In the following, a scalable layer and all the lower layers on which the scalable layer are directly or indirectly dependent are collectively called as the scalable layer representation.

The syntax of the extension to ISO base media file format can be as follows. The ScalabilityInfoEntry includes ProfileLevelBox, BitRateBox, FrameRateBox, FrameSizeBox, RectRegionBox, BufferingBox and LayerDependencyBox. Definitions of these boxes are as shown in Tables 3 and 4:

TABLE 3

| | |
|---|---|
| Box Types: | 'pflv', 'bitr', 'frmr', 'fmsz', 'rrgn', 'buff', 'ldep' |
| Container: | ScalableLayerEntry or other data structures |
| Mandatory: | No |
| Quantity: | 0 or 1 |

ProfileLevelBox contains the profile and level that the scalable layer representation is compliant with, BitRateBox contains the bit rate information, FrameRateBox contains the frame rate information, FrameSizeBox contains the spatial resolution information, BufferingBox contains the buffer information, LayerDependencyBox contains the layers that the scalable is dependent of. Amongst the boxes, the BufferingBox is an abstract box, a file format derived from ISO base media file format shall define a buffer information data structure according to the buffering model specified by the video coding standard. For a certain scalable layer, if any of the optional boxes is not present, then the described information is the same as the highest scalable layer.

TABLE 4

```
class ProfileLevelBox extends Box('pflv'){
    unsigned int(16) profileIdc;
    unsigned int(16) levelIdc;
    unsigned int(32) reserved = 0;
}
class BitRateBox extends Box('bitr'){
    unsigned int(32) avgBitrate;
    unsigned int(32) maxBitrate;
}
class FrameRateBox extends Box('frmr'){
    unsigned int(2) constantFrameRate;
    unsigned int(6) reserved = 0;
    unsigned int(16) frameRate;
}
class FrameSizeBox extends Box('fmsz'){
    unsigned int(16) frm_width;
    unsigned int(16) frm_height;
}
class RectRegionBox extends Box('rrgn'){
    unsigned int(16) horizontal_offset;
    unsigned int(16) vertical_offset;
    unsigned int(16) region_width;
    unsigned int(16) region_height;
}
abstract class BufferingBox extends Box('buff'){
}
class LayerDependencyBox extends Box('ldep'){
    unsigned int(8) entry_count;
    for (i=0; i < entry_count; i++){
        unsigned int(8) dependencyLayerId;
    }
}
class ScalableLayerEntry( ) extends VisualSampleGroupEntry ('scif')
{
    unsigned int(8) layerId;
```

TABLE 4-continued

```
    unsigned int(1) IsFgsLayer;
    unsigned int(1) IsSubsampleLayer;
    unsigned int(6) reserved = 0;
    ProfileLevelBox( );      // optional
    BitRateBox( );           // optional
    FrameRateBox( );         // optional
    FrameSizeBox( );         // optional
    RectRegionBox( );        // optional
    BufferingBox( );         // optional
    LayerDependencyBox( );   // optional
}
```

The semantics is as follows. The layerId gives the identifier of the scalable layer for which the following information describes.

IsFgsLayer equal to 1 indicates that the scalable layer is a fine granularity scalable (FGS) layer, the bitstream data unit of which can be truncated at any byte aligned position. A value 0 indicates that the scalable layer is not an FGS layer.

IsSubsampleLayer equal to 1 indicates that the scalable layer is formed only by sub-samples of the samples being mapped to the layer. The information on which sub-samples are included in this layer is signaled in the Sub-Sample Information Box. A value 0 indicates that the scalable layer is formed by the samples being mapped to the layer.

profileIdc and levelIdc specify the profile and level, respectively, with which the bitstream of the scalable layer representation is compliant.

avgBitrate gives the average bit rate, in bit/s, of the bitstream of the scalable layer representation.

maxbitrate gives the maximum bit rates, in bit/s, of the bitstream of the scalable layer representation in any time window of one second.

constantFrameRate indicates whether the frame rate of the scalable layer representation is constant. If the value of frameRate as specified in below is constant whichever a temporal section of the scalable layer representation is used for the calculation, then the frame rate is constant, otherwise the frame rate is non-constant. Value 0 denotes a non-constant frame rate, value 1 denotes a constant frame rate, and value 2 denotes that it is not clear whether the frame rate is constant. The value of constantFrameRate is in the range of 0 to 2, inclusive.

frameRate gives the average frame rate in units of frames/(256 seconds). All NAL units in the scalable layer presentation are taken into account in the calculation. In the following, C is the number of frames in the scalable layer representation. $t_1$ is the presentation timestamp of the first picture in the scalable layer representation in presentation order, and $t_2$ is the presentation timestamp of the latest picture in the scalable layer representation in presentation order. Then, frameRate is calculated as follows provided that $t_1 \neq t_2$: frameRate=round(C*256÷($t_2-t_1$)). If $t_1=t_2$, frameRate shall be 0. Value zero indicates an unspecified frame rate.

frm_width and frm_height give respectively the maximum width and height, in luma samples, of a video frame of the scalable layer representation. The term "frame" is interpreted in the same way as in the SVC coding specification.

horizontal_offset and vertical_offset give respectively the horizontal and vertical offsets, in luma samples, of the top-left pixel of the rectangular region represented by the scalable layer representation, in relative to the top-left pixel of the overall region represented by the highest scalable layer representation.

region_width and region_height give respectively the width and height of the rectangular region represented by the scalable layer representation, in luma samples of the same scale of the overall region represented by the highest scalable layer representation.

entry_count gives the number of entries in the following table.

dependencyLayerId gives the layerId of a scalable layer on which the current scalable layer is directly or indirectly dependent. The value of dependencyLayerId shall be smaller than the layerId of the current scalable layer. The representation of the current scalable layer requires the presence of the scalable layer indicated by dependency Layer.

The syntax of sub-sample information box is presented below in Table 5:

TABLE 5

```
aligned(8) class SubSampleInformationBox
    extends FullBox('subs', version, 0) {
    unsigned int(32) entry_count;
    int i,j;
    for (i=0; i < entry_count; i++) {
        unsigned int(32) sample_count;
        unsigned int(16) subsample_count;
        if (subsample_count > 0) {
            for (j=0; j < subsample_count; j++) {
                if(version == 1)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32) reserved = 0;
            }
        }
    }
}
```

In an example embodiment the first 8 bits of the 32-bit reserved field are used to signal the scalable layer identifier of which a sub-sample belongs to, i.e. the last syntax element above are divided into two syntax elements as presented in Table 6:

TABLE 6

```
...
unsigned int(8) layerId;
unsigned int(24) reserved = 0;
...
```

Similar methods can also be applied to support the signaling in other file formats. If it is supported in the ISO file format, then it is naturally supported in the derived file format such as MPEG-4 file format, AVC file format and 3GPP file format.

The inventors have developed the following SVC file format (AVC FF Amd.2) derived from ISO base media file format:

A sample is defined as follows in ISO base media file format:

In non-hint tracks, a sample is an individual frame of video, a time-contiguous series of video frames, or a time-contiguous compressed section of audio. In hint tracks, a sample defines the formation of one or more streaming packets. No two samples within a track may share the same time-stamp.

In scalable video, particularly for spatial and quality scalability, the above constraint that no two samples within a track may share the same timestamp is not applicable, because more than one picture (e.g. the base layer picture and the spatial enhancement layer picture) may share the same timestamp. If these pictures are made in the same sample, it is not handy for a server to do scalable truncation because parsing into samples is always needed.

In the SVC WD 1.0, picture is defined as follows:

A picture is decoded from a set of NAL units with an identical value of picture order count and DependencyId. The corresponding NAL units shall include slice NAL units for all macroblocks of a picture and possibly additional progressive refinement slice NAL units.

According to the above definition, progressive refinement slices (i.e. FGS slices) are in the same picture as the corresponding base layer. If the FGS slices and the corresponding base layer are made in the same sample, it is not handy for a server to do scalable truncation because parsing into samples is even needed for non-FGS operations. Therefore, in an example embodiment each FGS enhancement plane or the corresponding base layer is separated into its own picture.

A sub-sample is defined as one or more contiguous NAL units within one sample.

The first 8 bits of the reserved field in the ProfileLevelBox is used to contain the profile compatibility information, such that the syntax is as follows:

TABLE 7

```
class ProfileLevelBox extends Box('pflv'){
    unsigned int(16)   profileIdc;
    unsigned int(16)   levelIdc;
    unsigned int(8)    profile_compatibility;
    unsigned int(24)   reserved = 0;
}
``` profile_compatibility is a byte defined exactly the same as the byte which occurs between the profile_idc and level_idc in a sequence parameter set, as defined in the SVC video specification.

The following scalability information types are specific to the SVC coding format:
DependencyId and TemporalLevel
Used initial parameter sets
Buffer information To store that information, some new boxes can be defined to contain the information, and put them in the ScalabilityInfoEntry when needed.

TABLE 8

Box Types: 'ddep', 'ipms', 'sbuf'
Container: ScalableLayerEntry or other data structures
Mandatory: No
Quantity: 0 or 1
```
class DecodingDependencyInfoBox extends Box('ddep'){
    unsigned int(3) dependency_id;
    unsigned int(3) temporal_level;
    unsigned int(2) reserved = 0;
}
class InitialParameterSetBox extends Box('ipms'){
    unsigned int(5) numOfSequenceParameterSets;
    unsigned int(3) reserved = 0;
    for (i=0; i< numOfSequenceParameterSets; i++) {
        unsigned int(16) sequenceParameterSetLength ;
        bit(8*sequenceParameterSetLength) sequenceParameterSetNALUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength) pictureParameterSetNALUnit;
    }
}
```

TABLE 8-continued

```
class SvcBufferingBox extends BufferingBox('sbuf'){
    unsigned int(16)    operation_point_count
    for (i = 0; i < operation_point_count; i++){
        unsigned int (32)   tx_byte_rate
        unsigned int (32)   cpb_size
        unsigned int (32)   dpb_size
        unsigned int (32)   init_cpb_delay
        unsigned int (32)   init_dpb_delay
    }
}
```

The semantics is as follows.

dependency_id and temporal_level give respectively the scalable layer's values of DependencyId and TemporalLevel as defined in the SVC video specification.

numOfSequenceParameterSets indicates the number of sequence parameter sets that are used as the initial set of sequence parameter sets for decoding the scalable layer representation.

sequenceParameterSetLength indicates the length in bytes of the sequence parameter set NAL unit as defined in the SVC video specification.

sequenceParameterSetNALUnit contains a sequence parameter set NAL Unit, as specified in the SVC video specification. Sequence parameter sets shall occur in ascending order of parameter set identifier with gaps being allowed.

numOfPictureParameterSets indicates the number of picture parameter sets that are used as the initial set of picture parameter sets for decoding the scalable layer representation.

pictureParameterSetLength indicates the length in bytes of the picture parameter set NAL unit as defined in the SVC video specification.

pictureParameterSetNALUnit contains a picture parameter set NAL Unit, as specified in the SVC video specification. Picture parameter sets shall occur in ascending order of parameter set identifier with gaps being allowed.

operation_point_count specifies the number of operation points. Values of SVC HRD parameters are specified separately for each operation point. The value of operation_point_count shall be greater than 0.

tx_byte_rate indicates the input byte rate (in bytes per second) to the coded picture buffer (CPB) of SVC HRD. The bitstream of the scalable layer representation is constrained by the value of BitRate equal to 8*the value of tx_byte_rate for NAL HRD parameters as specified in the SVC video specification. For VCL HRD parameters, the value of BitRate is equal to tx_byte_rate*40/6. The value of tx_byte_rate shall be greater than 0.

cpb_size gives the required size of the coded picture buffer in bytes. The bitstream of the scalable layer representation is constrained by the value of CpbSize equal to cpb_size*8 for NAL HRD parameters as specified in the SVC video specification. For VCL HRD parameters, the value of CpbSize is equal to cpb_size*40/6.

dpb_size gives the required size of the decoded picture buffer, in unit of bytes. The bitstream of the scalable layer representation is constrained by the value of max_dec_frame_buffering equal to Min(16, Floor(post_dec_buf_size)/(PicWidthMbs*FrameHeightInMbs*256*ChromaFormatFactor))) as specified in the SVC video specification.

At least one set of values of tx_byte_rate, cpb_size and dpb_size of the same operation point shall conform to the constraints set by the profile and level of the bitstream of the scalable layer representation.

init_cpb_delay gives the required delay between the time of arrival in the pre-decoder buffer of the first bit of the first access unit and the time of removal from the pre-decoder buffer of the first access unit. It is in units of a 90 kHz clock. The bitstream of the scalable layer representation is constrained by the value of the nominal removal time of the first access unit from the coded picture buffer (CPB), tr,n(0), equal to init_cpb_delay as specified in the SVC video specification.

init_dpb_delay gives the required delay between the time of arrival in the post-decoder buffer of the first decoded picture and the time of output from the post-decoder buffer of the first decoded picture. It is in units of a 90 kHz clock. The bitstream of the scalable layer representation is constrained by the value of dpb_output_delay for the first decoded picture in output order equal to init_dpb_delay as specified in the SVC video specification assuming that the clock tick variable, tc, is equal to 1/90 000.

In the following, some motivations for the storage of the scalability information in file format or bitstream are presented.

Including all layers in one single track instead of using separate tracks for the layers is preferable because otherwise there may be hundreds of tracks for one scalable stream.

The mapping of samples/pictures to scalable layers is a grouping concept. The sample group design provides an elegant way to signaling the mapping information and also the scalability layer information of the scalable layers.

In many applications, some parts of the scalability information of the scalable layers are exactly the same as the entire elementary stream or the highest scalable layer. By categorizing and signaling the scalability information in different optional boxes, those information parts do not need to be redundantly stored. In addition, using boxes is flexible in the way that if more scalability information is needed it can be easily included by having new boxes in the sample group description entry.

Assuming that a streaming server has stored a scalable stream of profile P and level L, while a scalable layer of the stream could be of profile P1 and L1, and the implementation requirement of a decoder compliant with L1@P1 is simpler than a decoder compliant with L@P. If the server is going to feed the video content to a client with a decoder compliant with L1@P1, the server has to check the stream whether there is a scalable layer that is compliant with L1@P1, e.g., by running a hypothetical reference decoder, which imposes additional implementation and computation complexities to the streaming server. To have the profile and level information signaled for each scalable layer enables the above applications with a much simplified server implementation.

The bit rate, frame rate and frame size information are naturally needed for bit rate, temporal and spatial scalabilities. The region information is useful to support region-of-interest (ROI) scalability as required in N6880.

Decoding of different scalable layer representations requires different buffer sizes and buffering delays. The presence of buffer information enables a receiver/decoder of a scalable layer representation allocate less memory for decoding or have a shorter initial delay, both are helpful to improve end-user experience.

Though it is known that all higher layers are not required for a certain scalable layer representation, it is not known by default which lower layers are not required. The layer dependency information enables a streaming server not to send unnecessary lower layers without analyzing of the stream, which requires complex implementations.

To enable fine granularity scalability. This information indicates whether the scalable layer is a fine granularity scalable (FGS) layer, the bitstream data unit of which can be truncated at any byte aligned position.

Conventional coding techniques in AVC (i.e. not the new SVC extensions) can be employed to achieve ROI scalability, e.g., by using motion constrained slice group sets. However, there is a requirement (in Section 4 of N6880) saying that the SVC file format should be backward compatible with the AVC file format. To meet this requirement and to support the ROI scalability simultaneously, sub-sample information is needed, since the base layer (the ROI region) and the enhancement layer (the leftover region) have to be in the same sample. Thus, sub-picture layers can be utilized for this purpose.

The decoding dependency information is included in the NAL unit headers of scalable extension layer NAL units. In some applications, it is desirable to let a media-aware network element or the receiver know the information of which scalable layers can be discarded. To assist the media-aware network element or the receiver discard unnecessary NAL units, the mapping between the decoding dependency information and the scalable layer identifier is needed.

Due to fact that a scalable layer representation may not use all the initial parameter sets of the entire stream, to transmit all those parameter sets may cause a waste of transmission bandwidth and a longer initial setup delay, particularly because typically initial parameter sets are transmitted out-of-band and reliably, which implies that reception acknowledgement is used and retransmission may be used. Signaling of initial parameter sets for each scalable layer representation solves the problem. It is also possible for a server to get the information by analyzing the bitstream. However, that requires the server to be media-aware and to do on-the-fly bitstream analysis.

Signaling in Transmission and Control Protocols

In unicast streaming, e.g., 3GPP PSS, the server can create multiple alternatives for the same stream based on the scalability information, either through multiple SDP descriptions wherein each SDP description containing one or more than one alternative, or through one SDP description containing multiple alternatives. The receiving terminal chooses one or none of the alternatives. If one alternative is chosen, the server then knows which layers should be transmitted.

In multicast/broadcast applications, there may be receiving terminals of different capabilities and/or in different network conditions that result in that different alternatives of a stream are ideal for different receiving terminals. In this case, it is possible to divide the receivers into different multicast/broadcast groups, and the receivers in each group share the same alternative. Using this method, the available bandwidth for each receiving terminal may be efficiently utilized.

For a multicast/broadcast group wherein all the receivers share the same alternative, similar to the unicast case, the relevant layers are transmitted from the server side.

However, if there is more than one multicast/broadcast group, the server should present through the service announcement what alternatives are available, such that each receiver can choose one alternative service to subscribe. This can be achieved, for example, by using SDP in a similar manner as in the unicast case.

It is also possible that in one particular multicast/broadcast group one alternative with multiple layers are transmitted, while the receiver chooses to decode one of the layers and to discard the rest data. Using this method, the available bandwidth for the sending device may be efficiently utilized, because fewer streams are transmitted. In this case, with the same multicast/broadcast group, the server does not need to know the different preferences of different receiving terminals. However, it is still necessary for the server to present the alternatives information through service announcement such that the receiver can conclude whether it is able to decode any of the alternatives.

The above two methods can also be applied together. That is, there may be multiple multicast/broadcast groups. In some of the groups, all the receivers can decode the same alternative, while in the other groups some of the receivers may discard some of the received bit stream layers. The combined method may be used to globally optimize both the efficiency of the bandwidth available in the server and the efficiencies of the bandwidths available in the receivers.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other physical medium which can be used to store desired program code in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

Figure 1:
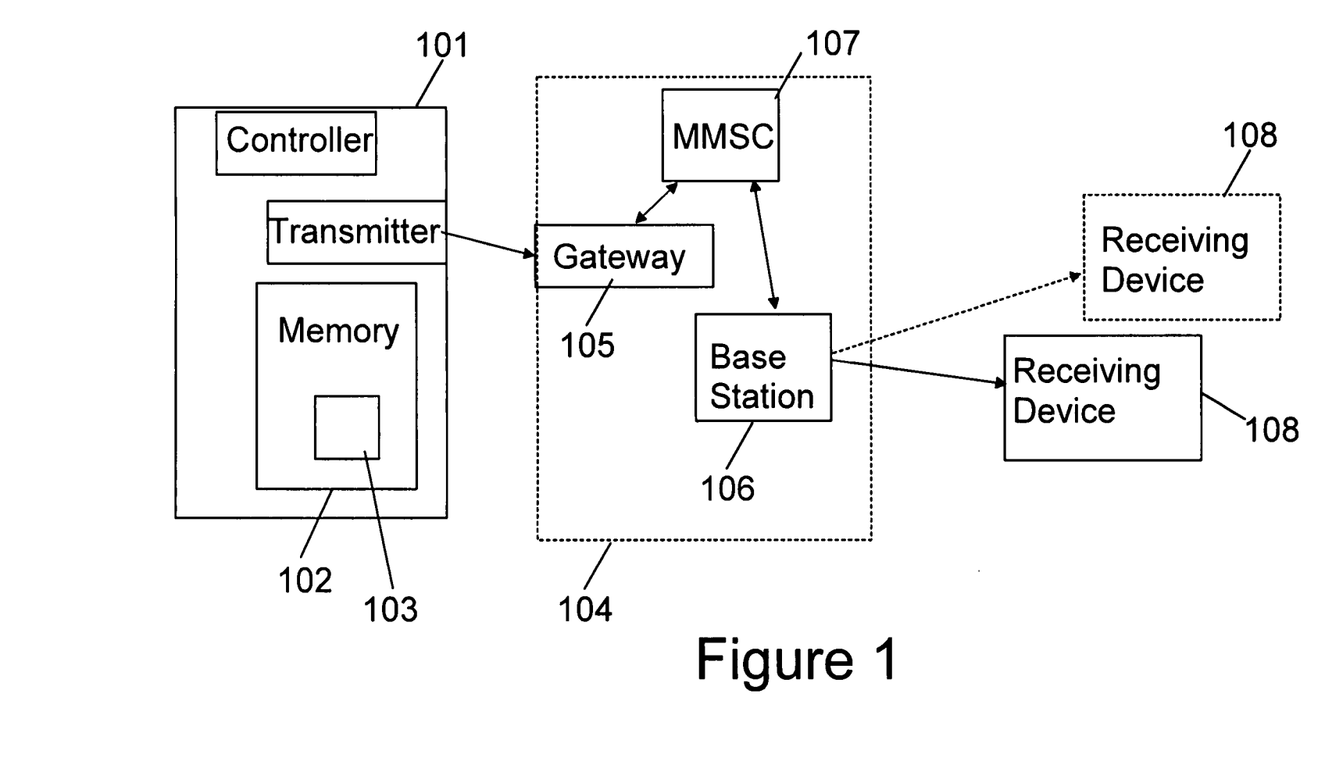
FIG. 1 is a diagram illustrating a system in which the present invention can be applied.

An example of a system in which the invention can be applied is depicted in FIG. 1. The system comprises transmitting server 101 which has e.g. a storage hmedia 102 containing a file 103 which contains a media stream encoded according to the present invention. The file 103 is transmitted as one or more signals to a network 104 such as a mobile communication network. In the network 104 there can be a gateway 105, which receives the file 103 and forwards it to e.g. a base station 106 of the network by e.g. control of the MMSC 107. A receiver 108 can receive the signal(s) and decode the scalability information and some other information included in the signal(s).

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated. For example, the description of embodiments of the present invention has been presented mostly for temporal scalability. However, it is applicable to all kinds of scalability, such as spatial scalability, computational scalability, and quality (signal-to-noise) scalability. Further, many transmission protocols can be applied with the present invention. Some non-limiting examples of the transmission protocols are Session Description protocol (SDP), Real-Time Streming protocol (RTSP) and Session Initilization protocol (SIP).

What is claimed is:

1. A method comprising:
    producing at least one enhancement layer for a scalable data stream, wherein said at least one enhancement layer is characterized by a coding property, wherein said coding property includes the following:
    a sub-picture scalable layer information representing a horizontal and vertical offset of a top-left pixel position of a region covered by the at least one enhancement layer relative to a top-left pixel of the scalable data stream;
    determining Network Abstraction Layer (NAL) units to be discarded for a desired scalable presentation point, and
    causing signaling of said at least one enhancement layer with said characterized coding property such that the coding property is readable by a decoder without the need to decode the entire said at least one enhancement layer.

2. A method according to claim 1, wherein said signaling is performed within a bit stream of said scalable data stream.

3. A method according to claim 1, wherein said signaling is performed within a file format capable of storing said scalable data stream.

4. A method according to claim 1, wherein said signaling is performed within a transmission protocol capable of transmitting said scalable data stream.

5. An apparatus comprising:
    a scalable data encoder configured to produce at least one enhancement layer of a scalable data stream, wherein said at least one enhancement layer is characterized by a coding property, wherein said coding property includes the following:
    a sub-picture scalable layer information representing a horizontal and vertical offset of a top-left pixel position of a region covered by the at least one enhancement layer relative to a top-left pixel of the scalable data stream;
    said data encoder determining Network Abstraction Layer (NAL) units to be discarded for a desired scalable presentation point, and
    a signaling component configured to signal said enhancement layer with said characterized coding property such that the coding property is readable by a decoder without the need to decode the entire said at least one enhancement layer.

6. An apparatus according to claim 5, wherein said signalling component is configured such that said signaling is performed within a bit stream of said scalable data stream.

7. An apparatus according to claim 5, wherein said signalling component is configured such that said signaling is performed within a file format capable of storing said scalable data stream.

8. An apparatus according to claim 5, wherein said signalling component is configured such that said signaling is performed within a transmission protocol capable of transmitting said scalable data stream.

9. An apparatus according to claim 5, wherein said data stream comprises video data.

10. A non-tansitory computer-readable storage medium having a computer coded instructions stored therein, and stored with a data structure implementing a scalable data stream comprising:
    a first layer of data having a first coding property, wherein said coding property includes the following:
    a sub-picture scalable layer information representing a horizontal and vertical offset of a top-left pixel position of a region covered by the at least one enhancement layer relative to a top-left pixel of the scalable data stream;
    a first indication associated with said first layer identifying said first coding property;
    a second layer of data having a second coding property;
    a second indication associated with said second layer identifying said second coding property; and
    a one or more of a Session Description Protocol (SDP), a Real-Time Streaming Protocol (RTSP), and a Session Initilization Protocol (SIP) descriptions created from the data stream content.

11. A non-transitory computer-readable storage medium according to claim 10, wherein said first indication is associated with a bit stream of said scalable data stream.

12. A non-transitory computer-readable storage medium according to claim 10, wherein said first indication is associated with a file format capable of storing said scalable data stream.

13. A non-transitory computer-readable storage medium according to claim 10, wherein said scalable data stream comprises video data.

14. A non-transitory computer-readable medium storing a machine-readable program code for causing, when executed, one or more devices to perform the following:
    producing at least one enhancement layer of a scalable data stream, wherein said at least one enhancement layer is characterized by a coding property, wherein said coding property includes the following:
    a sub-picture scalable layer information representing a horizontal and vertical offset of a top-left pixel position of a region covered by the at least one enhancement layer relative to a top-left pixel of the scalable data stream;
    determining Network Abstraction Layer (NAL) units to be discarded for a desired scalable presentation point, and
    causing signaling of said at least one enhancement layer with said characterized coding property such that the coding property is readable by a decoder without the need to decode the entire said at least one enhancement layer.

15. A non-transitory computer-readable medium according to claim 14, wherein said signaling is performed within a bit stream of said scalable data stream.

16. A non-transitory computer-readable medium according to claim 14, wherein said signaling is performed within a file format capable of storing said scalable data stream.

17. A non-transitory computer-readable medium according to claim 14, wherein said signaling is performed within a transmission protocol capable of transmitting said scalable data stream.

18. A non-transitory computer-readable medium according to claim 14, wherein said data stream comprises video data.

19. An apparatus comprising:
means for producing at least one enhancement layer for a scalable data stream, wherein said at least one enhancement layer is characterized by a coding property, wherein said coding property includes the following:
a sub-picture scalable layer information representing a horizontal and vertical offset of a top-left pixel position of a region covered by the at least one enhancement layer relative to a top-left pixel of the scalable data stream;
means for signaling said at least one enhancement layer with said characterized coding property such that the coding property is readable by a decoder without the need to decode the entire said at least one enhancement layer; and
means for determining Network Abstraction Layer (NAL) units to be discarded for a desired scalable presentation point.

20. An apparatus according to claim 19, wherein said data stream comprises video data.

21. A device for encoding comprising an encoder for encoding a scalable data stream, said encoder comprising:
a first component for producing at least one enhancement layer of a scalable data stream, wherein said at least one enhancement layer is characterized by a coding property, wherein said coding property includes the following:
a sub-picture scalable layer information representing a horizontal and vertical offset of a top-left pixel position of a region covered by the at least one enhancement layer relative to a top-left pixel of the scalable data stream;
said first component determining Network Abstraction Layer (NAL) units to be discarded for a desired scalable presentation point, and
a second component for signaling said enhancement layer with said characterized coding property such that the coding property is readable by a decoder without the need to decode the entire said at least one enhancement layer.

* * * * *